US009645887B2

(12) United States Patent
Chen et al.

(10) Patent No.: US 9,645,887 B2
(45) Date of Patent: May 9, 2017

(54) SYSTEM FOR FIRMWARE UPGRADE IN AMI AND METHOD THEREOF

(71) Applicant: Industrial Technology Research Institute, Chutung, Hsinchu (TW)

(72) Inventors: Yao-Hsin Chen, Hsinchu (TW); Ping-Hai Hsu, Hsinchu (TW)

(73) Assignee: Industrial Technology Research Institute, Chutung, HsinChu County (TW)

( * ) Notice: Subject to any disclaimer, the term of this patent is extended or adjusted under 35 U.S.C. 154(b) by 298 days.

(21) Appl. No.: 14/487,223

(22) Filed: Sep. 16, 2014

(65) Prior Publication Data

US 2015/0149991 A1  May 28, 2015

(30) Foreign Application Priority Data

Nov. 27, 2013  (TW) .............................. 102143193 A

(51) Int. Cl.
*G06F 15/16* (2006.01)
*G06F 11/14* (2006.01)
(Continued)

(52) U.S. Cl.
CPC .......... *G06F 11/1412* (2013.01); *G06F 8/665* (2013.01); *G06F 11/1402* (2013.01);
(Continued)

(58) Field of Classification Search
CPC .... G06F 8/65; G06F 11/1412; G06F 11/1402; H04L 9/3247; H04L 67/10; H04L 9/3226; H04L 67/12
See application file for complete search history.

(56) References Cited

U.S. PATENT DOCUMENTS 7,133,926 B2   11/2006  Jones et al.
7,756,992 B1 *  7/2010  Zhao ..................... H04L 63/145
                                                  709/203
(Continued)

FOREIGN PATENT DOCUMENTS

CN    101183932 A    5/2008
CN    102273184 A   12/2011
(Continued)

OTHER PUBLICATIONS

Young-jun Kim, et al, A Remote Firmware Upgrade Method of NAN and HAN Devices to Support AMI's Engergy Services Sep. 2011 G Lee, D. Howard, et al, ICHIT 2011, CCIS 206, pp. 303-310, 2011 Springer Verlag Berlin Heidelberg 2011.*
(Continued)

*Primary Examiner* — John Macilwinen
(74) *Attorney, Agent, or Firm* — McCarter & English, LLP; Yu Lu

(57) ABSTRACT

A system and method for firmware upgrade in an AMI are provided. A remote server provides a firmware image file. After receiving the firmware image file and verifying the remote server, a data concentrator transmits at least one encoding symbol generated from the firmware image file to at least one meter through broadcasting and a retransmission mechanism of minimum retransmission contents. Upon receiving a predetermined number of encoding symbols, each meter recovers the original firmware image file from the received encoding symbols. Then, each meter receives and verifies an activation code generated by the remote server before carrying out the firmware upgrade.

12 Claims, 16 Drawing Sheets

(51) Int. Cl.
    *H04L 29/08*     (2006.01)
    *G06F 9/445*     (2006.01)
    *H04L 9/32*     (2006.01)

(52) U.S. Cl.
    CPC ............ *H04L 67/10* (2013.01); *H04L 9/3226* (2013.01); *H04L 9/3247* (2013.01); *H04L 67/12* (2013.01)

(56) References Cited

U.S. PATENT DOCUMENTS

| | | | |
|---|---|---|---|
| 8,462,015 B2 | 6/2013 | Picard | |
| 2006/0130045 A1* | 6/2006 | Wesley | G06F 8/65 717/168 |
| 2006/0143475 A1* | 6/2006 | Herbert | H04L 63/0428 713/191 |
| 2008/0086652 A1* | 4/2008 | Krieger | G06F 1/26 713/330 |
| 2011/0258296 A1 | 10/2011 | Garrison Stuber et al. | |
| 2012/0036343 A1 | 2/2012 | Lee | |
| 2012/0060152 A1 | 3/2012 | Oh et al. | |
| 2013/0125107 A1 | 5/2013 | Bandakka et al. | |

FOREIGN PATENT DOCUMENTS

| | | |
|---|---|---|
| CN | 103182183 A | 7/2013 |
| EP | 2515082 A1 | 10/2012 |
| TW | 200849931 A | 12/2008 |
| TW | 201334491 A | 8/2013 |

OTHER PUBLICATIONS

Itani et al., "PETRA: A Secure and Energy-Efficient Software Update Protocol for Severely-Constrained Network Devices," Proceedings of the 5th ACM Symposium on QoS and Security for Wireless and Mobile Networks, pp. 37-43 (2009).

Katzir and Schwartzman, "Secure Firmware Updates for Smart Grid Devices," IEEE PES International Conference and Exhibition on Innovative Smart Grid Technologies (ISGT Europe), pp. 1-5 (2011).

Kim et al., "A Remote Firmware Upgrade Method of NAN and HAN Devices to Support AMI's Energy Service," *Convergence and Hybrid Information Technology*, 206:303-310 (2011).

Sauter and Lobashov, "End-to-End Communication Architecture for Smart Grids," *IEEE Transactions on Industrial Electronics*, 58(4):1218-1228 (2011).

Tang et al., "Power Monitoring Device based on Peer-to-Peer Communication," Power and Energy Engineering Conference (APPEEC), 2010 Asia-Pacific, pp. 1-4 (2010).

Wee and Kim, "A New Code Compression Method for FOTA," *IEEE Transactions on Consumer Electronics*, 56(4):2350-2354 (2010).

Franklin et al., "PRISM: enabling personal verification of code integrity, untampered execution, and trusted i/o on legacy systems or human-verifiable code execution," CyLab, Pittsburgh, PA, 21 pages (2007).

Goodrich et al., "Loud and clear: Human-verifiable authentication based on audio," ICDCS 2006 26th IEEE International Conference on Distributed Computing Systems, 8 pages (2006).

McCune and Perrig, "Seeing-is-believing: Using camera phones for human-verifiable authentication," *Intl. J. Security & Networks*, 4(1/2):43-56 (2009).

Prasad et al., "Efficient device pairing using 'human-comparable' synchronized audiovisual patterns," *Applied Cryptography and Network Security*, pp. 328-345 (2008).

Soriente et al., "BEDA: Button-enabled device association," *Citeseer*, 7 pages (2007).

Soriente et al., "HAPADEP: human-assisted pure audio device pairing," *Information Security*, Springer BVerlin Heidelberg pp. 385-400 (2008).

English abstract of CN 101183932.
English abstract of CN 102273184.
English abstract of CN 103182183.
English abstract of TW 200849931.
English abstract of TW 201334491.

* cited by examiner

SYSTEM FOR FIRMWARE UPGRADE IN AMI AND METHOD THEREOF

CROSS-REFERENCE TO RELATED APPLICATIONS

This application claims foreign priority under 35 U.S.C. §119(a) to Patent Application No. 102143193, filed on Nov. 27, 2013, in the Intellectual Property Office of Ministry of Economic Affairs, Republic of China (Taiwan, R.O.C.), the entire content of which Patent Application is incorporated herein by reference.

BACKGROUND OF THE INVENTION

1. Technical Field

The present disclosure relates to remote firmware upgrade techniques, and, more particularly, to a system and method for firmware upgrade in an Advanced Metering Infrastructure (AMI).

2. Description of Related Art

With the increase in environmental awareness and energy issues, many countries are committed to build the smart grid in the hope of saving energy by having more efficient allocation and operations of power resources through monitoring and management. In order to achieve the objective, a type of infrastructure capable of two-way communication called Advanced Metering Infrastructure (AMI) has been proposed. Information about the power system can be gathered and act on through the application of AMI, which is the reason why AMI has become the backbone of the smart grid.

AMI network is regarded as the entry point for the deployment of the smart grid, and is also the infrastructure linking power supply side and demand side. The AMI network consists of three basic elements: meters, a data concentrator and a head-end server. The meters (e.g., a smart meter) and the head-end server establish communications through the intermediate data concentrator. In order to extend the useful life, scalability and real-time patching of security vulnerabilities are crucial to the meters. In other words, the meters are required to have the capability of remote firmware upgrade to accommodate for future applications or patches of security vulnerabilities. However, the number of meters in an AMI network is usually very large. In addition, the communication interfaces between the meters and the data concentrator are narrow-band networks, for example, narrow-band power line communication, so transmission is very slow and the speed of upgrade may be affected. Sometimes, the metering of the meter is affected if upgrade is not completed. For example, firmware upgrade in the current AMI is one-to-one, i.e., the head-end server providing a firmware image file to the data concentrator, which then partitions the firmware image file into a plurality of small files and transmits them to each meter. When the file(s) missing in each meter is different, the data concentrator has to retransmit those missing files individually. This is time consuming and inefficient. Thus, it is a major challenge to accomplish firmware upgrade of the meters without affecting metering.

In addition to the efficiency of firmware upgrade, security protection is also an important factor to the success of the firmware upgrade. During a firmware upgrade, one needs to avoid an attacker using a backdoor firmware to steal confidential information on the AMI network or violate users' privacy. In particular, the data concentrator needs to ensure that the source of the received firmware image file is trusted and the meters need to verify the validity of the files coming from the data concentrator in order to establish a complete security protection. It is clear from the foregoing that the procedure of meter firmware upgrade in the existing AMI still needs to be improved. For example, firmware upgrade could be completed in one metering cycle (about 15 minutes), and security measures such as source verification and end-to-end security protection could be provided. The legitimacy of the firmware source could be ensured before meter firmware upgrade is performed to avoid compromise of the procedure due to the data concentrator being compromised.

Therefore, there is a need for a method that is capable of remotely upgrading firmware in the meters of an AMI with increased efficiency while ensuring the security of the firmware upgrade without the need to change the existing architecture of the AMI network.

SUMMARY OF THE INVENTION

The present disclosure provides a system and method for firmware upgrade in an Advanced Metering Infrastructure (AMI) with increased upgrade efficiency through broadcast/multicast transmission mechanism in combination with forward error correction (FEC). Moreover, the security of the firmware upgrade process can be ensured through firmware source verification and end-to-end security technique.

The present disclosure provides a system for firmware upgrade in an AMI, which includes a remote server, a data concentrator and at least one meter. The remote server includes a database to store firmware image files and a security module to generate a digital signature and an activation code. The data concentrator is connected to the remote server and includes a verification module and a broadcasting module. The verification module is used to verify the firmware image file from the remote server using the digital signature. The broadcasting module is used to broadcast a predetermined number or more of encoding symbols generated from the firmware image file, to obtain minimum retransmission contents based on a receiving status of the encoding symbols, and further broadcasting new encoding symbols, the amount of which matches the minimum retransmission contents. Moreover, the at least one meter is connected to the data concentrator to receive the encoding symbols. Each meter may include an FEC decoder and a verification module. The FEC decoder is used to decode the encoding symbols from the data concentrator and to recover the firmware image file based on the encoding symbols. The verification module is used to check the status of completion of the firmware image file recovered by the FEC decoder, and to obtain the activation code generated by the remote server from the data concentrator. The activation code after successful verification is used to drive the firmware upgrade of the meter.

In an embodiment, the data concentrator further includes an FEC encoder to gather the size of firmware blocks and the sizes of transmission frames of the meter to obtain a transmission constraint of the meter, comparing the transmission constraints of all the meters to obtain a unit partition size of the encoding symbols, and encoding the firmware image file received to create at least one encoding symbol of a size matching the unit partition size. The unit partition size may use a minimum partition size.

In another embodiment, the remote server further includes an FEC encoder to encode the firmware image file with a specific firmware block size to generate an encoded firmware image file to be transmitted to the data concentrator.

The present disclosure further provides a method for firmware upgrade in an Advanced Metering Infrastructure (AMI). The method includes obtaining, by using a data concentrator, a firmware image file from a remote server and confirming the legitimacy of the firmware image file through a source verification mechanism; broadcasting, by using the data concentrator, at least one encoding symbol generated by encoding the firmware image file to at least one meter, wherein the number of the at least one encoding symbols is a predetermined number of more, calculating a minimum retransmission contents based on a message returned by each meter, and further transmitting new encoding symbols until every meter has received enough encoding symbols to recover the firmware image file; verifying the version and integrity of the firmware image file; and obtaining, by using each meter, an activation code and activating firmware upgrade once the correctness of the activation code is confirmed.

In an embodiment, the encoding of the firmware image file includes the data concentrator obtaining a transmission constraint supported by each meter and encoding the firmware image file based on the transmission constraints of the meters through an encoding symbol length algorithm to generate at least one encoding symbols, or the remote server encoding the firmware image file with a predetermined firmware block size to generate an encoded firmware image file and transmitting it to the data concentrator for subsequent transmission.

DETAILED DESCRIPTION OF THE INVENTION

Figure 1:
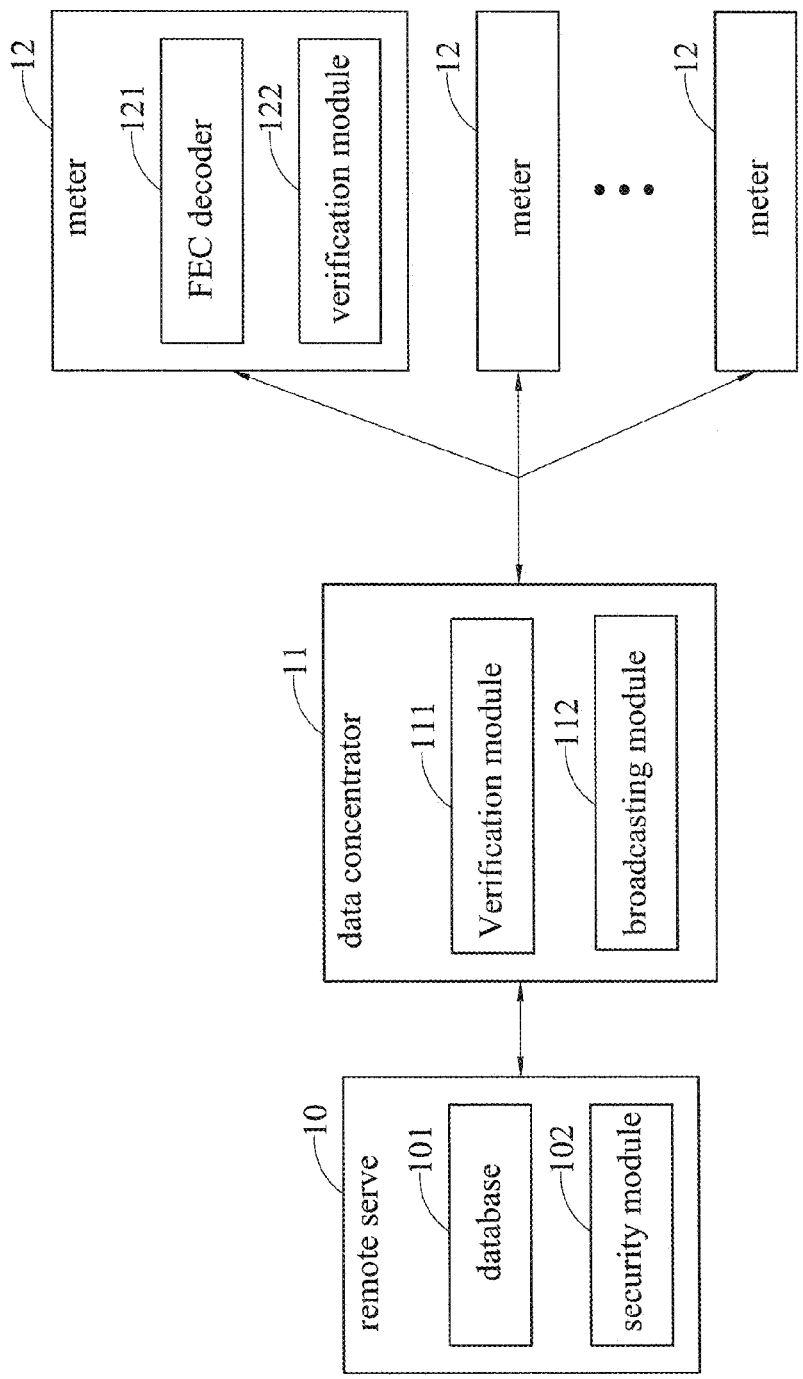
FIG. 1 is a schematic diagram depicting a system for firmware upgrade in an AMI in accordance with the present disclosure.

In the following detailed description, for purposes of explanation, numerous specific details are set forth in order to provide a through understanding of the disclosed embodiments. It will be apparent, however, that one or more embodiments may be practiced without these specific details. In other instances, well-known structures and devices are schematically shown in order to simplify the drawing.

FIG. 1 is a schematic diagram depicting a system 1 for firmware upgrade in an Advanced Metering Infrastructure (AMI) in accordance with the present disclosure. The system 1 provides firmware upgrade for meters in the AMI. Although existing meters in the AMI are capable of performing firmware upgrade, this is done by one-to-one unicast transmission and individual retransmissions of missing firmware partitioned files for respective meters. This causes low performance of the firmware upgrade process, and also lacks a better way of verification. Thus, the present disclosure provides a firmware upgrade mechanism with high performance and security.

The system 1 includes a remote server 10, a data concentrator 11 and at least one meter 12.

The remote server 10 includes a database 101 and a security module 102. The database 101 is used for storing firmware image files. The security module 102 is used for generating a digital signature and an activation code. The digital signature can be used by the data concentrator 11 to confirm whether the data received is indeed from the remote server 10. The activation code is used by the meter 12 to activate the upgrade.

The data concentrator 11 is connected to the remote server 10, and includes a verification module 111 and a broadcasting module 112.

The verification module 111 verifies the digital signature to confirm whether the received firmware image file is indeed coming from the remote server. The verification module 111 primarily guarantees the security between the remote server 10 and the data concentrator 11, so as to prevent the data concentrator 11 from receiving data from an illegitimate remote server 10.

The broadcasting module 112 broadcasts a predetermined number or more of encoding symbols that are generated from the firmware image file, obtains the minimum retransmission contents based on the receiving status of the encoding symbols, and then broadcasts new encoding symbols, i.e., encoding symbols that have not been transmitted before, the number of which matches the number of minimum retransmission contents. In contrast to the existing techniques, the present embodiment transmits the encoding symbols by broadcasting and, based on the receiving status of the encoding symbols of the meter 12, calculates the number of encoding symbols to be retransmitted next. In other words, the broadcasting module 112 will compare the predetermined number with the number of encoding symbols received by the meter 12 to determine the number of encoding symbols still required to recover the firmware image file for the meter 12. This is the aforementioned minimum retransmission contents. Thereafter, encoding symbols that have previously not been broadcasted can now be broadcasted to make up the number of encoding symbols required to recover the firmware image file of the meter 12.

In the technique of the present disclosure, the original file before partitioning can be recovered after a certain number of partitioned files are received. In the present embodiment, the meter has got enough encoding symbols to perform the recovery process, and does not care which encoding symbol is missing in each meter. For example, the present embodiment may employ a forward error correction (FEC) encoding technique. That is, if the firmware image file is encoded into ten encoding symbols and the FEC technique has five encoding symbols for recovery, then encoding symbols numbered one to five can be transmitted first, and after the number of missing encoding symbols are gathered from each meter, for example, the maximum number is two, then regardless of which meters are missing which encoding symbols, encoding symbols numbered six and seven are retransmitted to allow the meters to gather the required number of encoding symbols for recovery.

In addition, a plurality of independent meters 12 can be connected to the data concentrator 11. Each of the meters 12 includes an FEC decoder 121 and a verification module 122. The FEC decoder 121 decodes the encoding symbols from the data concentrator 11 in order to recover the firmware image file from the encoding symbols. In other words, when the meters 12 have gathered enough encoding symbols, the FEC decoder 121 can recover the original firmware image file from the encoding symbols.

Moreover, the verification module 122 is used for checking the status of completion of the firmware image file recovered by the FEC decoder 121, and obtaining and verifying the activation code from the remote server 10 from the data concentrator 11. If the activation code is verified, that is, if the activation code is indeed provided by the remote server 10, the activation code can be used for activating the firmware upgrade of the meter.

It can be seen from the above that the remote server 10 provides control of the version of the firmware, and provides the firmware image file to the data concentrator 11. Upon receiving the firmware image file, the data concentrator 11 uses its verification module 111 to verify the legitimacy of the remote server 10. After the remote server 10 is verified, the data concentrator 11 generates encoding symbols from the firmware image file, and broadcasts these encoding symbols through the broadcasting module 112, so as to transmit processed firmware image file (i.e., encoded into at least one encoding symbols) to the meter 12.

Upon receiving the encoding symbols transmitted by the data concentrator 11, the meter 12 uses the FEC decoder 121 to decode the encoding symbols in order to recover the original firmware image file. After the completion of the recovery is confirmed, the firmware image file is temporarily stored away. Then, the meter 12 receives and verifies the activation code generated by the security module 102 of the remote server 10. After the activation code is verified, the firmware upgrade of the meter 12 can be performed.

Figure 2:
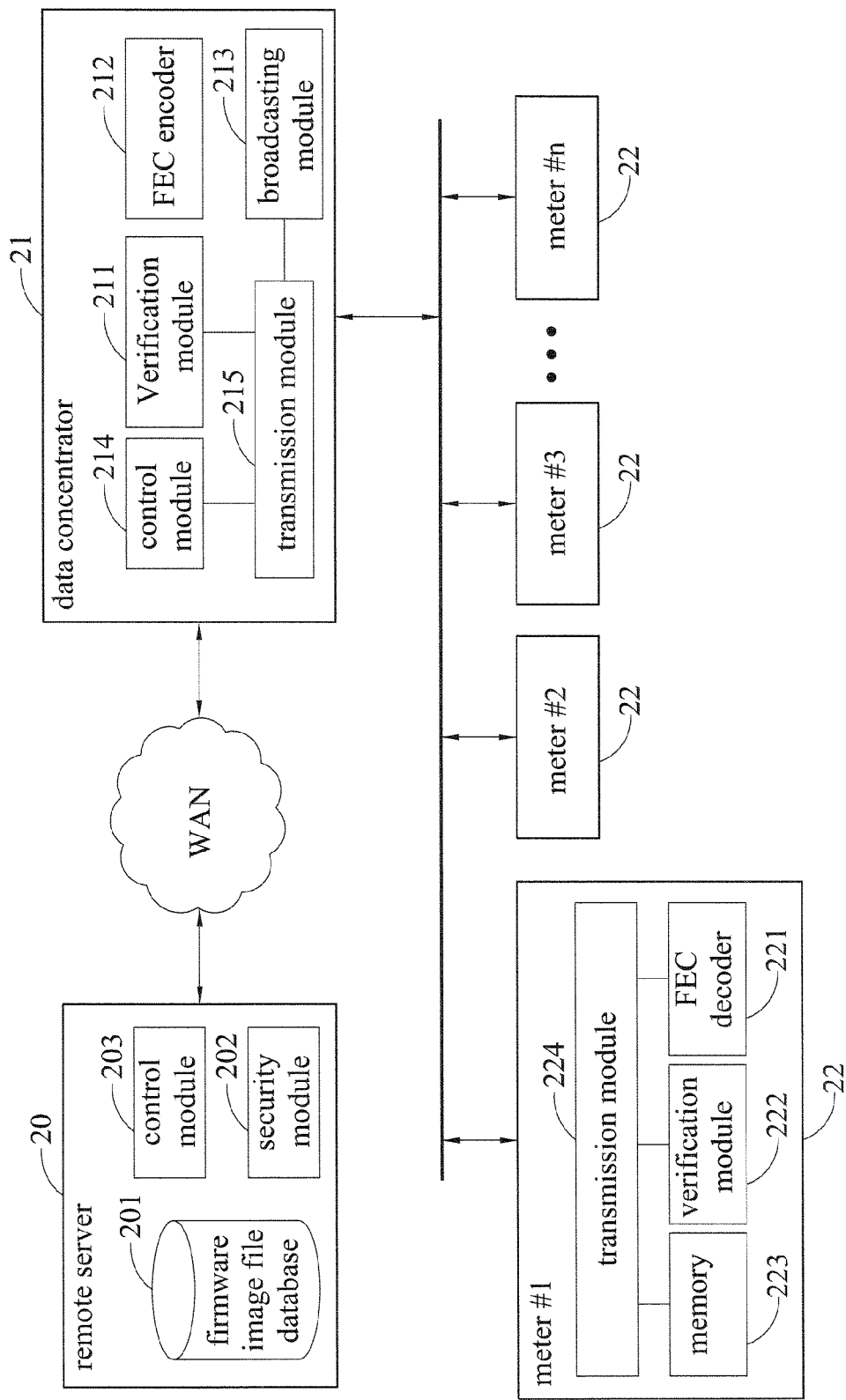
FIG. 2 is a schematic diagram illustrating an embodiment of the system for firmware upgrade in an AMI in accordance with the present disclosure.

FIG. 2 is a schematic diagram illustrating an embodiment of a system 2 for firmware upgrade in an AMI in accordance with the present disclosure. The system 2 also includes a remote server 20, a data concentrator 21 and a plurality of meters 22.

The functions of a firmware image file database 201 and a security module 202 in the remote server 20 are similar to those of the database 101 and the security module 102 of FIG. 1. The functions of a verification module 211 and a broadcasting module 212 in the data concentrator 21 are similar to those of the verification module 111 and the broadcasting module 112 of FIG. 1. The functions of an FEC decoder 221 and a verification module 222 in the meter 22 are similar to those of the FEC decoder 121 and the verification module 122 of FIG. 1.

In this embodiment, the remote server 20 further includes a control module 203 for providing operations for the remote server 20, such as communication or management of the firmware version. In addition, the data concentrator 21 further includes an FEC encoder 212, a control module 214 and a transmission module 215.

The FEC encoder 212 is used for calculating the minimum partition size of the firmware image file, so that after the firmware image file is encoded, a number of encoding symbols matching the minimum partition size can be generated. More specifically, FEC encoder 212 essentially encodes the firmware image file into an appropriate size before transmitting the firmware image file. The appropriate size mentioned herein is a unit partition size obtained by the FEC encoder 212 by gathering transmission constraints (such as the sizes of firmware blocks and the sizes of transmission frames) of the meter 22. The unit partition size can be the minimum partition size of the encoding symbols. The size of the image file blocks and the size of the transmission frames are to be illustrated in more details later.

Moreover, apart from performing the encoding procedure of the firmware image file on the data concentrator 21, the encoding procedure of the firmware image file can also be performed on other devices, such as the remote server 20. That is, the remote server 20 may encode the firmware image file before transmitting it to the data concentrator 21. An embodiment in which the encoding of the firmware image file is performed on the remote server 10 will be described later.

The control module 214 is used for providing the basic operations inside the data concentrator 21. For example, it operates the transmission module 215 to carry out data transmission. The transmission module 215 is used for carrying out data transmission between the remote server 20 and the meters 22, and can be connected to the verification module 211 thereafter for verification of the remote server 20. The firmware image file encoded by the FEC encoder 212 can be also transmitted via the broadcasting module 213 from the transmission module 215. The meter 22 includes a memory 223 for temporarily storing the firmware image file decoded by the FEC decoder 221, and a transmission module 224 for outward transmission for the meter 22.

Furthermore, a Wide Area Network (WAN) is between the remote server 20 and the data concentrator 21, and a Neighborhood Area Network (NAN) such as Power Line Communication (PLC) or Radio frequency (RF) is between the data concentrator 21 and the meters 22.

Figure 3A:
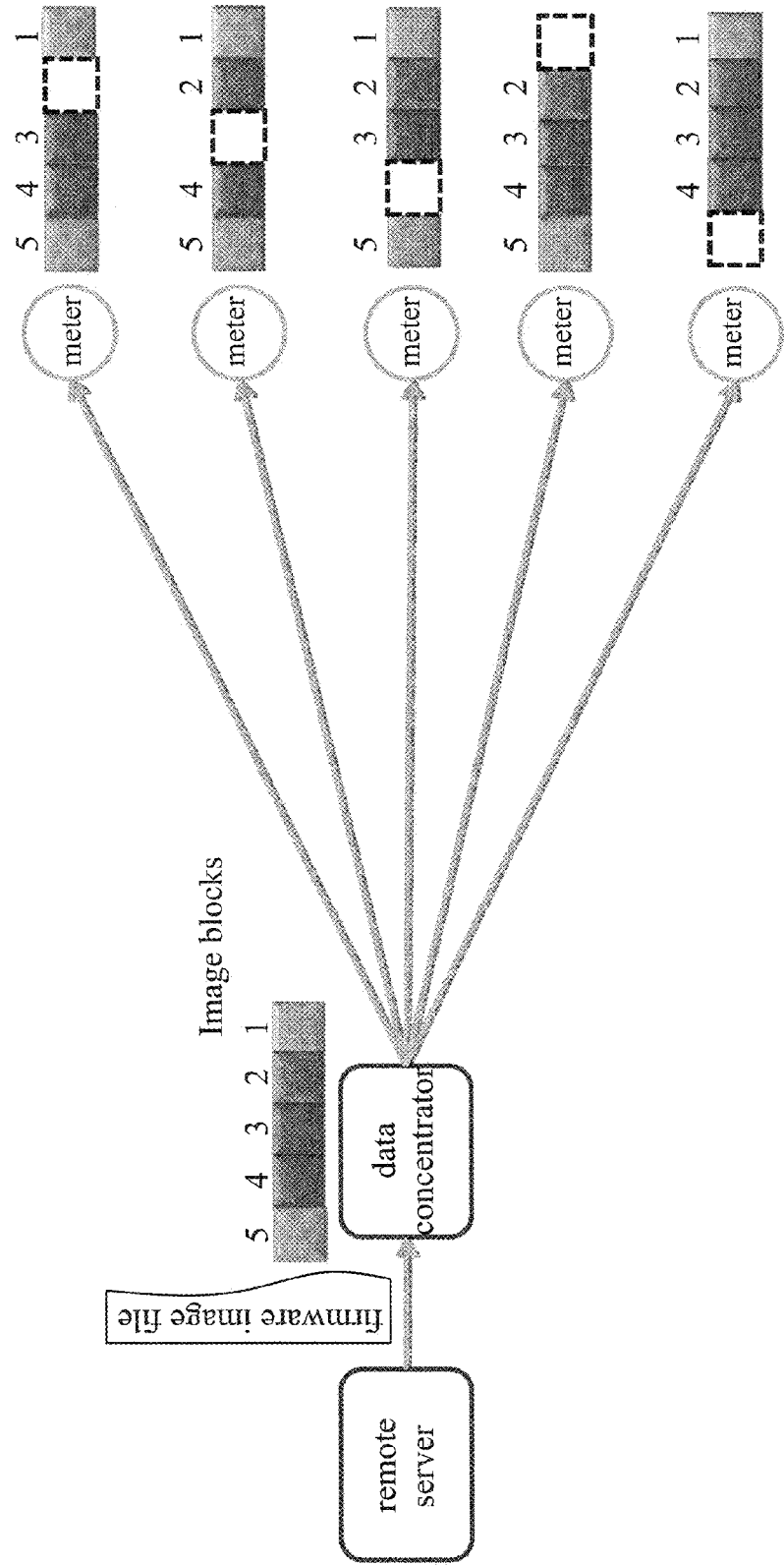
FIGS. 3A and 3B are schematic diagrams depicting firmware upgrade processes in the prior art and the present disclosure, respectively.
Figure 3B:
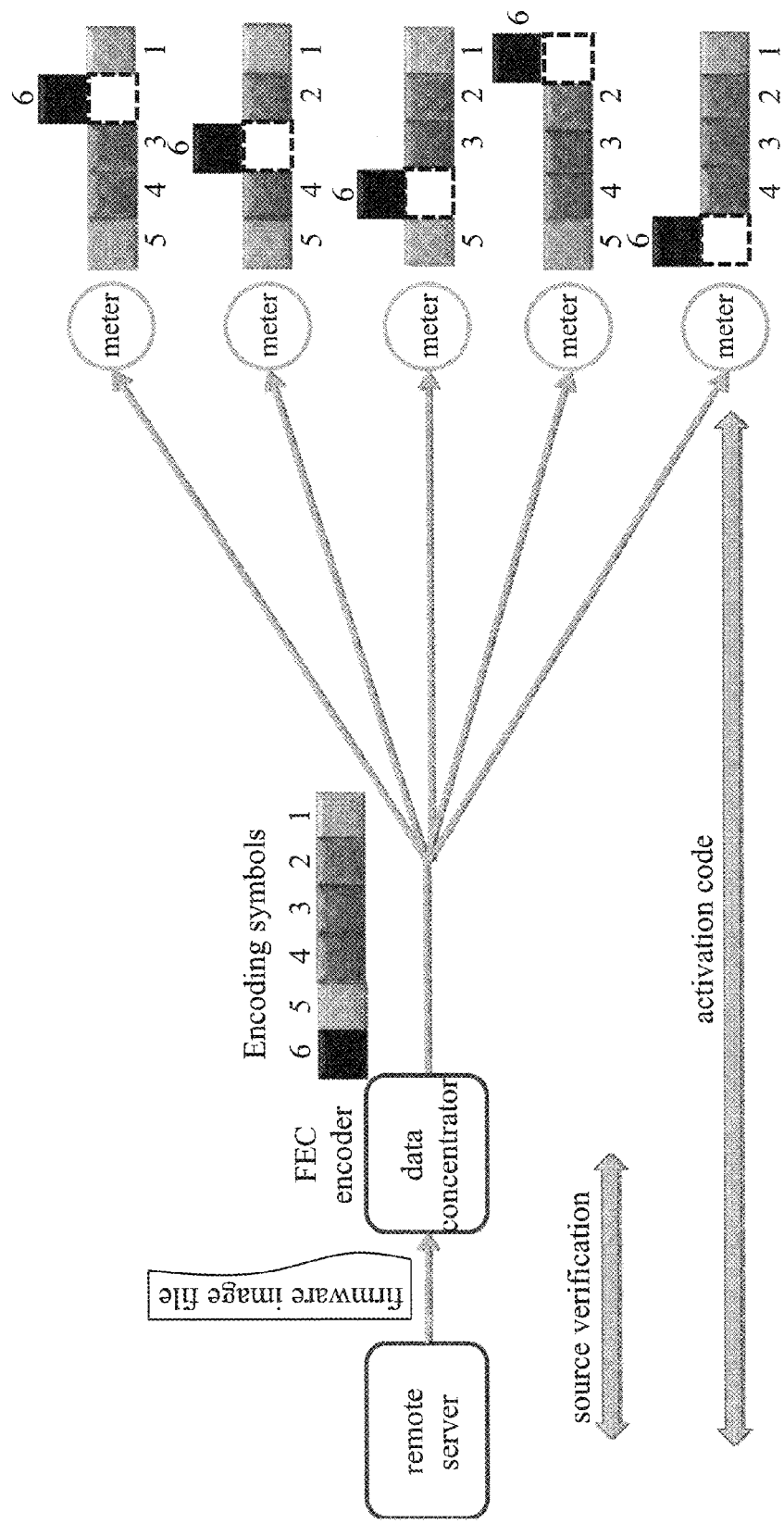

FIGS. 3A and 3B are schematic diagrams depicting firmware upgrade processes in the prior art and the present disclosure, respectively. As shown in FIG. 3A, the issue present in the existing meter firmware upgrade is illustrated. First, a remote server transmits a firmware image file to a data concentrator, which then partitions the firmware image file into a plurality of blocks of image files, numbered one to five as shown. The transmission between the data concentrator and each meter is one-to-one. After transmission, the meter may miss a different image file block. In current meter firmware upgrade mechanism, the data concentrator could retransmit the block(s) missed by respective meter separately. This is inefficient and time consuming, and may even indirectly affect the metering period.

In contrast, in the present disclosure shown in FIG. 3B, a remote server similarly transmits a firmware image file to a data concentrator, which then encodes the firmware image file via an FEC encoder and then partitions it into a plurality of encoding symbols, numbered 1-6 as shown. In this embodiment, the transmission between the data concentrator and the meter is not one-to-one; rather the data concentrator broadcasts the encoding symbols. As described before, the decoding process of the FEC decoder does not need to wait for all of the encoding symbols to be obtained, but only a certain number of encoding symbols. In this embodiment, this number is five, so the data concentrator will first transmit encoding symbols numbered one to five.

After transmission, the meter may miss a different encoding symbol (in the diagram, the contents received by the five meters are all different), but with the FEC encoding mechanism in this embodiment, the firmware image file can be recovered as long as there are enough encoding symbols available. It just happens that the meter lacks one encoding symbols, so the data concentrator can transmit the encoding symbol numbered six. Once the meter obtains the encoding symbol numbered six, it has enough encoding symbols to recover the firmware image file.

It can be seen from the above that it is not necessary to know which encoding symbols are missed by the meter, the remaining number of encoding symbols are required for decoding to take place. That is, when a meter has not gathered enough encoding symbols, the data concentrator can keep providing new (not previously transmitted) encoding symbols to the meter. Therefore, with the employment of broadcasting transmission instead of the one-to-one transmission, and in conjunction with replacing the need to know which encoding symbols are missed by the respective meters to transmit the remaining number of encoding symbols required of decoding, the retransmission mechanism becomes simpler and faster.

Finally, security control is accomplished by source verification mechanism between the data concentrator and the remote server. The meters also require activation codes provided by the remote server to trigger firmware upgrade. Thus, with source verification and activation codes guarantee the validity of the firmware version and transmission security.

Figure 4:
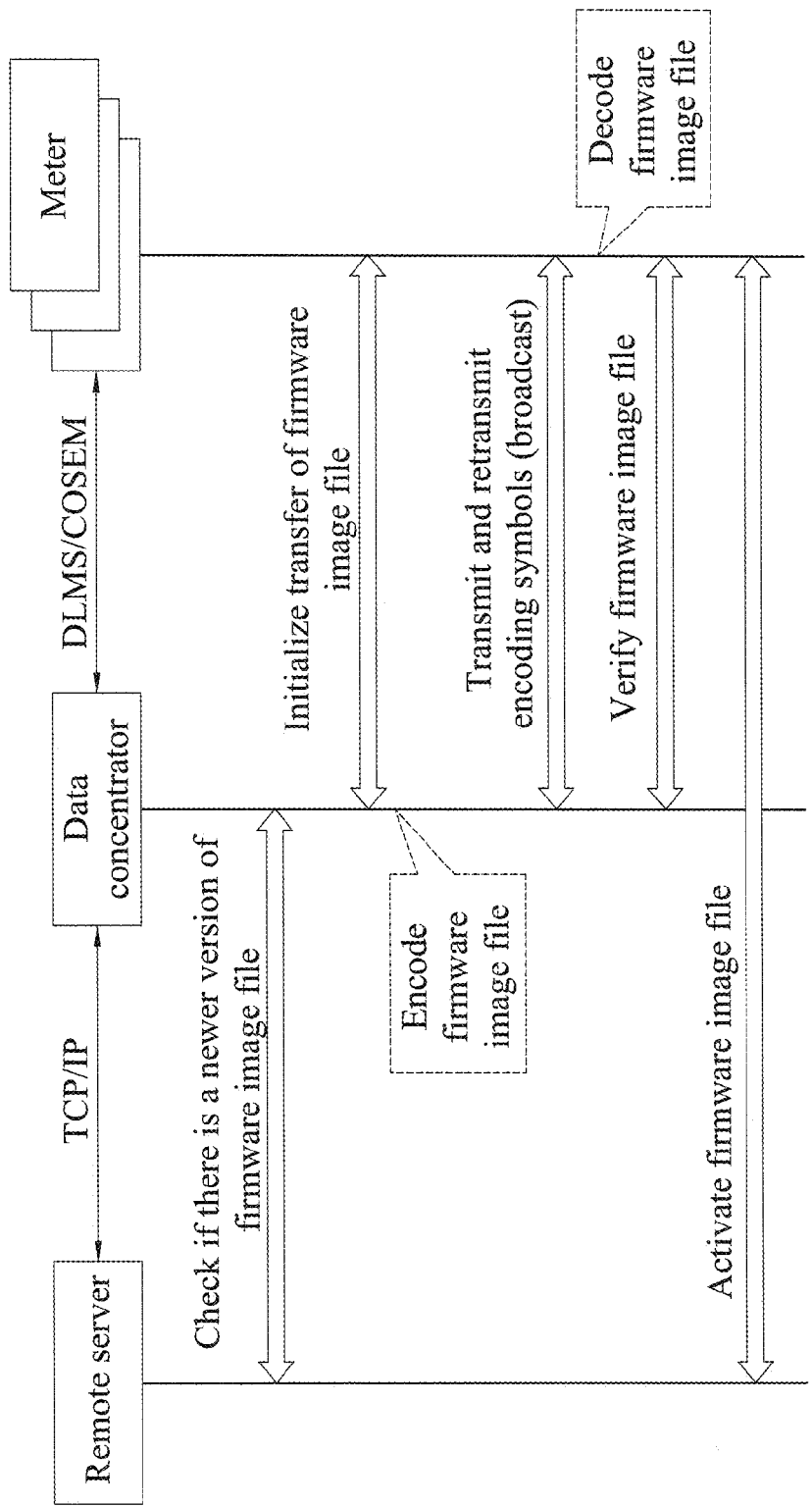
FIG. 4 is a flowchart illustrating a method for firmware upgrade in an AMI in accordance with the present disclosure.

FIG. 4 is a flowchart illustrating a method for firmware upgrade in an AMI in accordance with the present disclosure. As shown, a remote server and a data concentrator communicate with each other through TCP/IP communication protocol. The data concentrator and meters are connected through Device Language Message Specification (DLMS) and Companion Specification for Energy Metering (COSEM).

The data concentrator inquires the remote server to check if there is a newer version of the firmware image file. More specifically, if there is a newer version of the firmware image file, the data concentrator will request the firmware image file from the remote server.

Initialization of firmware image file transfer is executed between the data concentrator and the meters in order to know the firmware block size supported by the meter and how to encode/partition the firmware image file, for example.

Transmission and retransmission of the encoded firmware image file (i.e., encoding symbols) are executed between the data concentrator and the meters. The firmware image file is broadcasted. Since FEC encoding mechanism is employed in this embodiment, the meters collect a certain number of encoding symbols for the decoding of the encoding symbols to take place.

Verification of the firmware image file is executed between the data concentrator and the meters to ensure the files received by the meters are correct. The meters will thus perform verification on the data concentrator, including the version and the integrity of the firmware image file.

Finally, the meters will obtain activation codes from the remote server, which is used to activate the firmware image file in the meters in order for firmware upgrade to be triggered.

FIGS. 5A to 5E are flowcharts illustrating steps of FIG. 4. As shown in FIG. 5A to 5E, each diagram illustrates a respective step of FIG. 4.

Figure 5A:
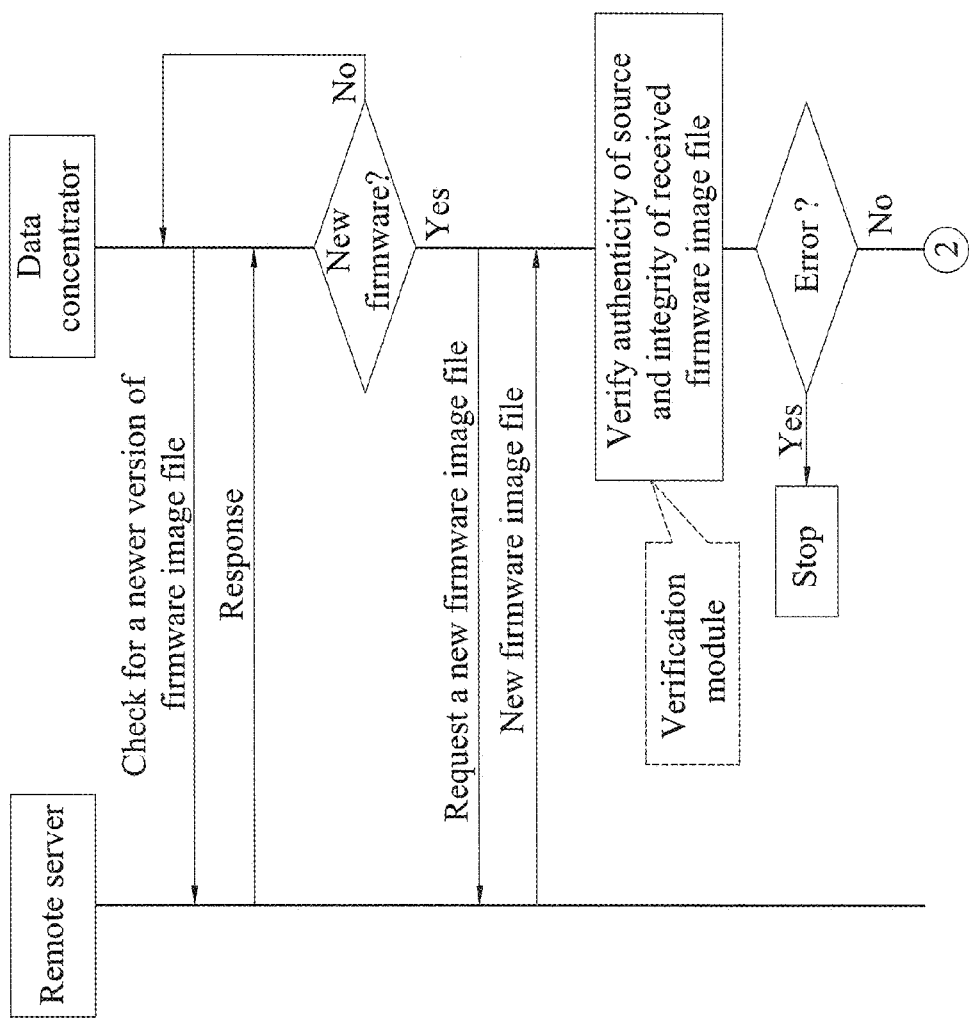
FIGS. 5A to 5E are flowcharts illustrating steps of FIG. 4.

As shown in FIG. 5A, the data concentrator inquires the remote server to check if there is a newer version of the firmware image file, and obtains a newer version of the firmware image file if applicable. First, the data concentrator inquires the remote server to see if there is a new firmware image file. If the response from the remote server is negative, a period of time is elapsed before the next inquiry. If the response is positive, then the new firmware image file is requested. The remote server transmits the new firmware image file to the data concentrator accordingly. Meanwhile, the data concentrator performs source verification to ensure the remote server is legitimate, and makes sure the integrity of the received firmware image file. If there is an error, then the process is stopped; else, proceed to the next step. More specifically, the aforementioned source verification can be implemented by asymmetric encryption algorithms to verify the legitimacy of the remote server.

Figure 5B:
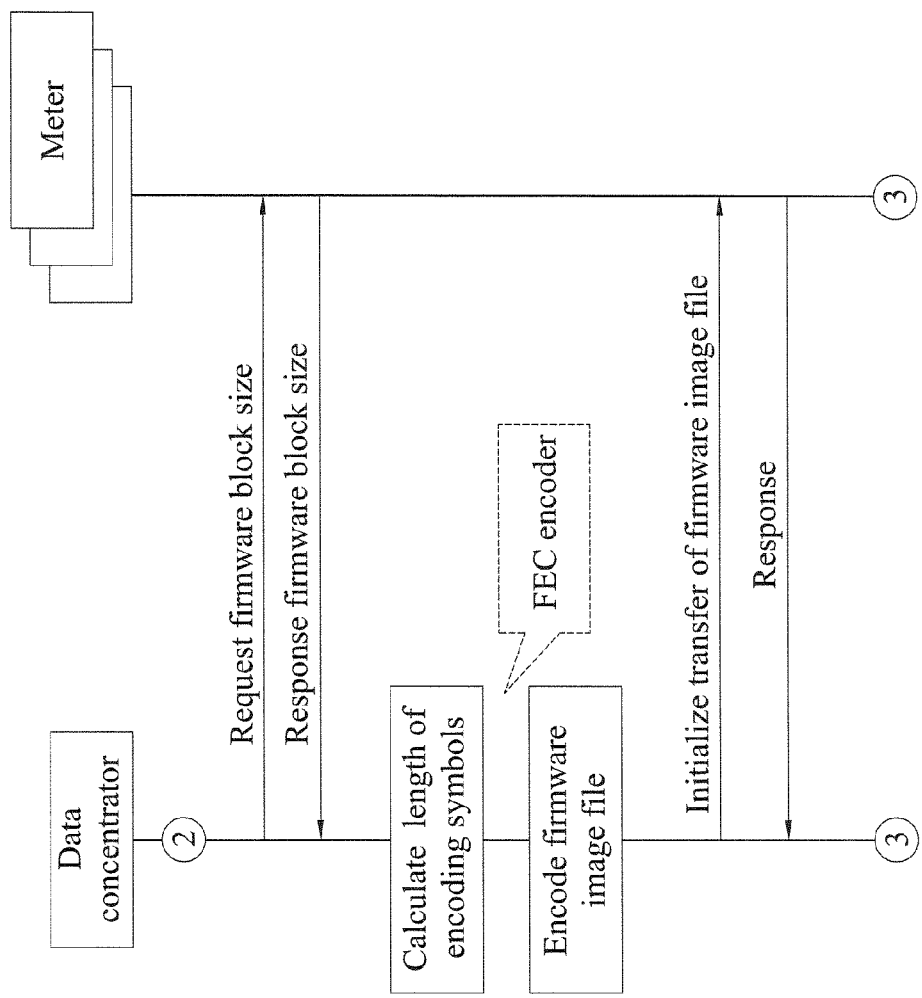

As shown in FIG. 5B, initialization of firmware image file transfer is executed between the data concentrator and the meters. First, the data concentrator will request the firmware block size and the size of transmission frames supported by the meter (transmission constraints) (by one-to-one or broadcasting method). The meter then responds. Thereafter, the data concentrator calculates the appropriate length of the encoding symbols to be used, for example, the minimum partition size of the encoding symbols. Then, the firmware image file is encoded through the FEC encoder of FIG. 2. Next, the data concentrator notifies the meters of information such as the version and the size of the firmware, thereby completing the initialization of the firmware image file transfer.

The calculation of the length of the encoding symbols can be performed by an encoding symbol length algorithm. That is, a partition size of the encoding symbols can be determined based on the transmission constraints of the meter, i.e., based on the image file block size (application layer) and the transmission frame size (High-level Data Link Control (HDLC) layer) of the meter.

Figure 5C:
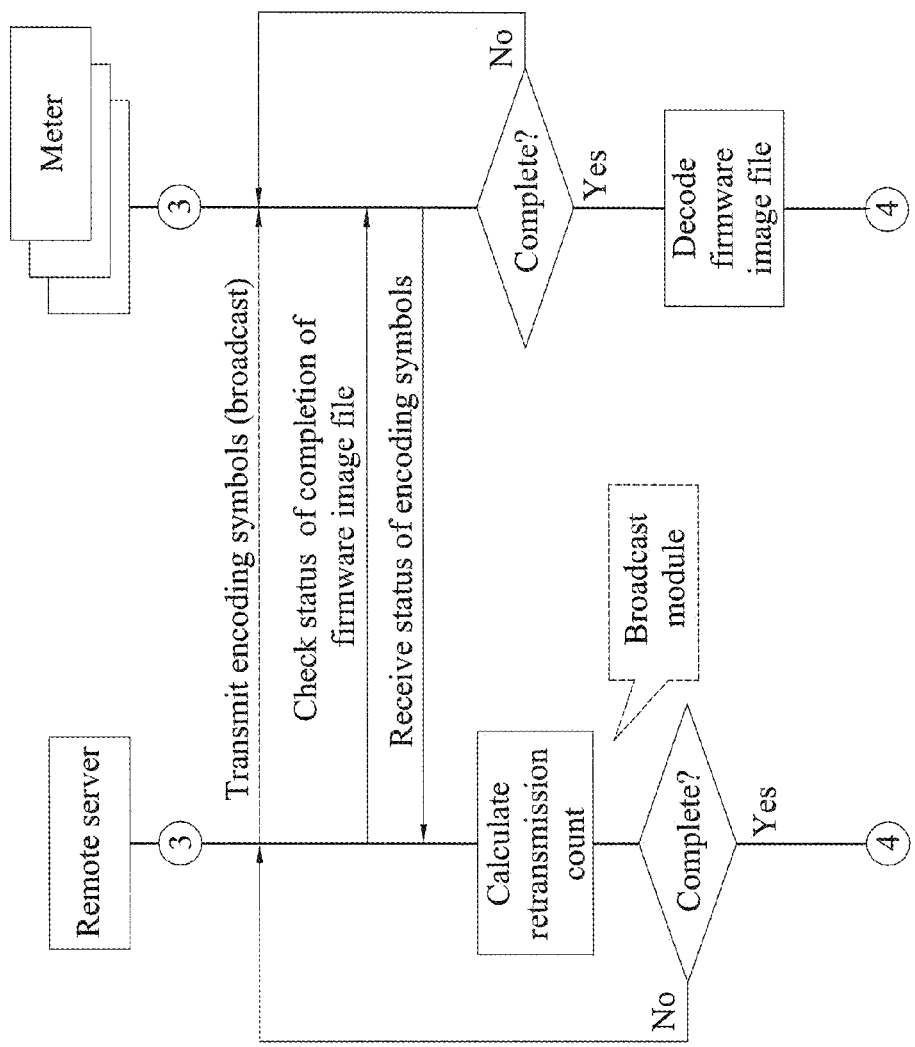

As shown in FIG. 5C, transmission and retransmission of the encoding symbols between the data concentrator and the meters are illustrated. The data concentrator broadcasts the encoding symbols to the meter. Then, the data concentrator requests the status of completion of the firmware image file from the meter, and in response, the meter will return the receiving status of the encoding symbols. Meanwhile, if retransmission is needed, the data concentrator will calculate the minimum number of retransmission contents. This can be done by the broadcasting module of the data concentrator in FIG. 1. Before completion, the encoding symbols are continuously transmitted, and, at the same time, the meter end will determine if enough encoding symbols are received. If so, the encoding symbols are decoded to recover the original firmware image file.

The aforementioned encoding symbol length algorithm includes gathering the firmware block size and the transmission frame size of the meter and obtaining the transmission constraint of the meter from the two, and after comparing the transmission constraints of the meters, using the minimum transmission constraint as the unit partition size of the encoding symbols. For example, a minimum partition size is used as the unit partition size of the encoding symbols. The message returned by the meter during the transmission of the firmware image file indicates how many more encoding symbols are required for decoding to take place.

It is clear from the above that the data concentrator uses a broadcasting method to transmit a plurality of encoding symbols to the meter, and employs a retransmission calculation algorithm to calculate the minimum retransmission contents based on the returned messages from the meters, so that the data concentrator may further broadcast new encoding symbols until every meter has gathered enough encoding symbols to recover the firmware image file.

Figure 5D:
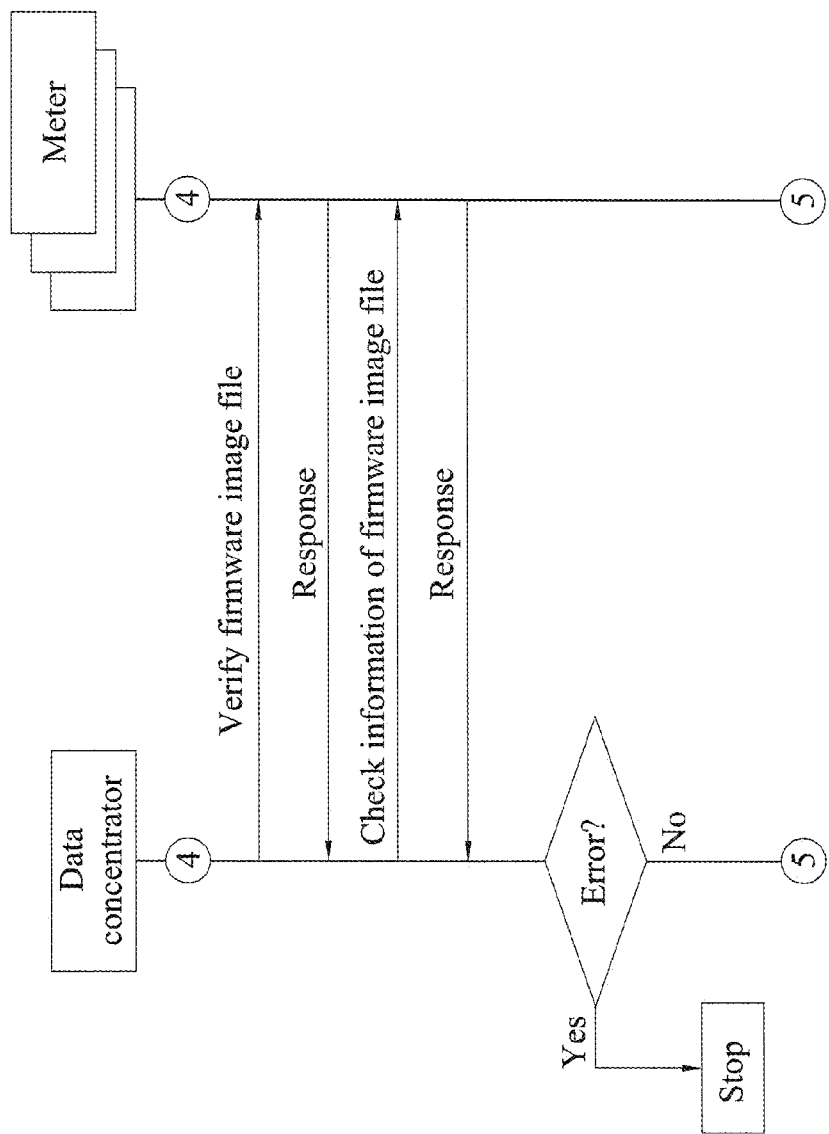
Figure 5E:
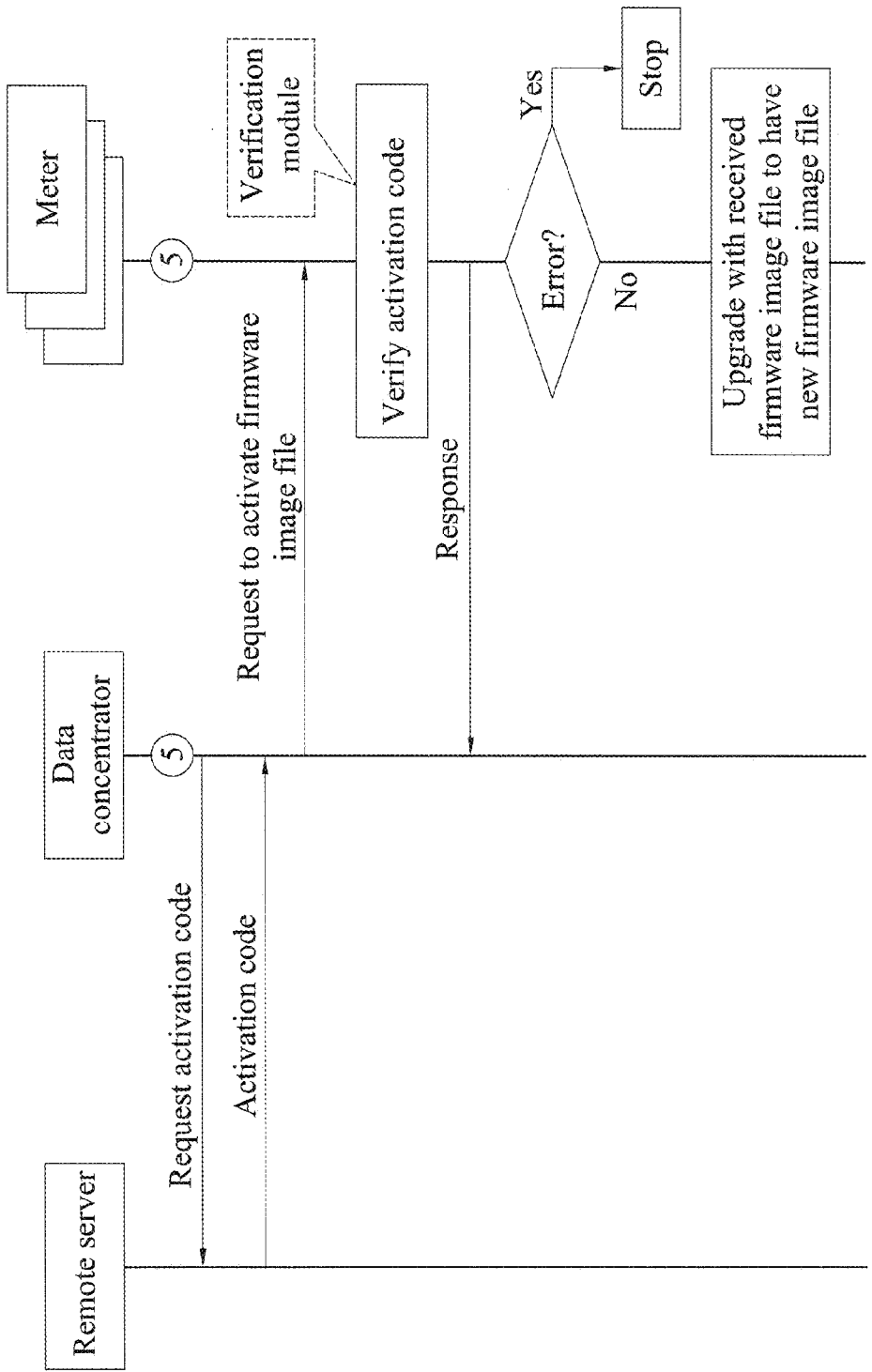

As shown in FIG. 5D, verifying the firmware image file is executed between the data concentrator and the meters. The data concentrator will confirm the version or information of the firmware image file with the meters. If there is an error, the upgrade process is stopped. If not, as shown in FIG. 5E, the meters will obtain activation codes from the remote server in order to being the firmware upgrade. First, the data concentrator obtains an activation code from the remote server, and then the data concentrator requests the meter to activate the firmware image file. Meanwhile, the verification module in the meter may verify the activation code and return the result to the data concentrator. If the meter discovers that the activation code is incorrect, the upgrade is stopped; else if no error is found, the meter upgrades the current version of firmware to the newest version.

Figure 6:
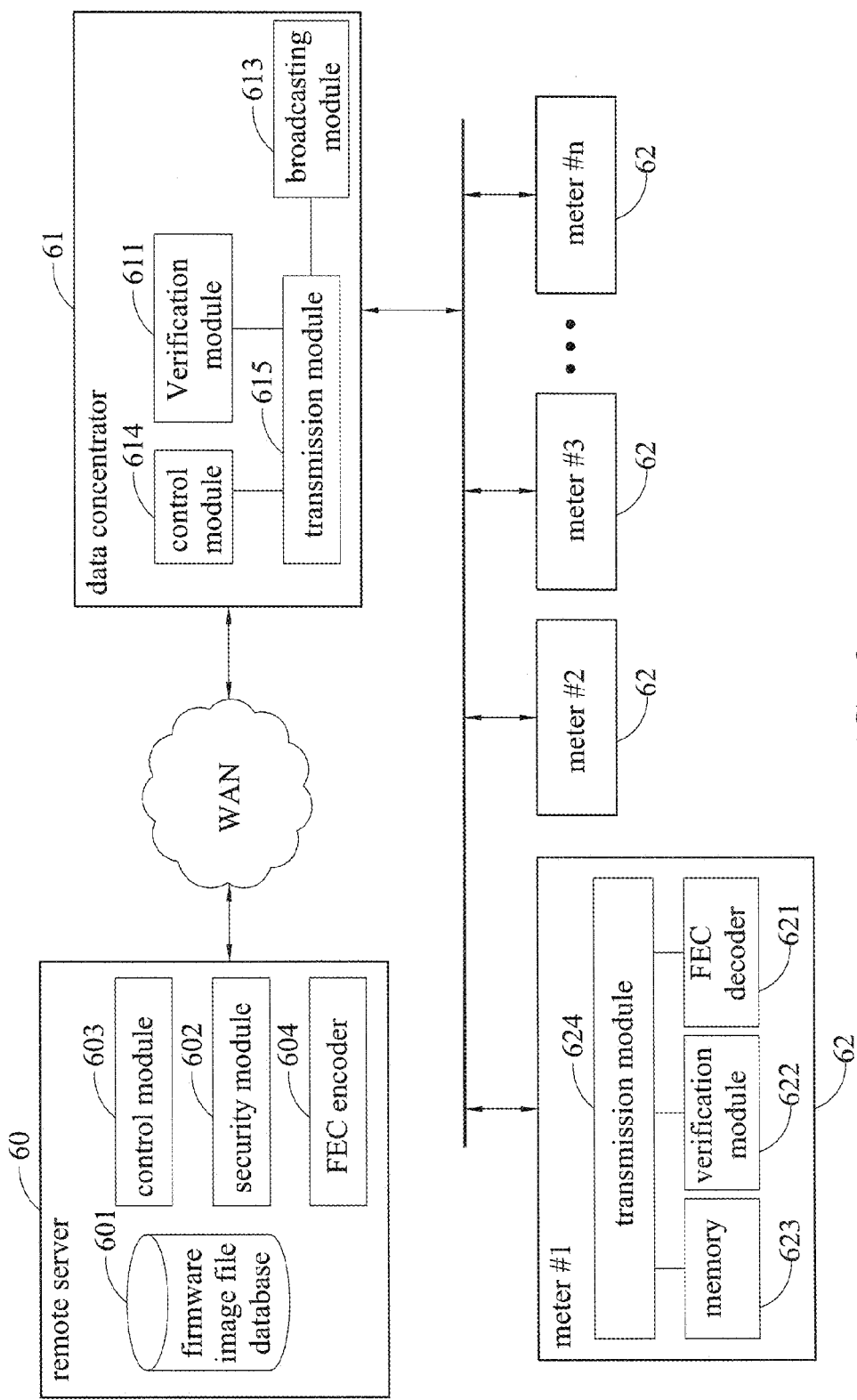
FIG. 6 is a schematic diagram illustrating another embodiment of the system for firmware upgrade in an AMI in accordance with the present disclosure.

FIG. 6 is a schematic diagram illustrating another embodiment of a system 6 for firmware upgrade in an AMI in accordance with the present disclosure. The system 6 similarly includes a remote server 60, a data concentrator 61 and a plurality of meters 62.

The functions of a firmware image file database 601, a security module 602 and a control module 603 in the remote server 60 are similar to those of the firmware image file database 201, the security module 202 and the control module 203 of FIG. 2. The functions of a verification module 611, a broadcasting module 613, a control module 614 and a transmission module 615 in the data concentrator 61 are similar to those of the verification module 211, the broadcasting module 212, the control module 214 and the transmission module 215 of FIG. 2. The functions of an FEC decoder 621, a verification module 622, a memory 623 and a transmission module 624 in the meter 62 are similar to those of the FEC decoder 221, the verification module 222, the memory 223 and the transmission module 224 of FIG. 2.

In this embodiment, the remote server 60 further includes an FEC encoder 604. Different from the embodiment shown in FIG. 2, the FEC encoding process of this embodiment is carried out at the remote server 60 rather than the data concentrator 61. In other words, the remote server 60 pre-processes the firmware image file before transmitting it to the data concentrator 61. This embodiment is applicable when the firmware block sizes supported by the meter 62 are the same.

Compared to the embodiment shown in FIG. 2, which gathers the firmware block size and the transmission frame size of the meter 22, and obtains the minimum partition size of the encoding symbols by comparing the transmission constraints of the meters 22 in order to encode the firmware image file, the remote server 60 in this embodiment encodes the firmware image file with a specific firmware block size to generate encoding symbols of the firmware image file, and then transmits the encoding symbols to the data concentrator 61, so the data concentrator 61 can then broadcast those to the meter 62. The subsequent broadcasting and retransmission mechanisms are the same as those described in the previous embodiment.

Figure 7:
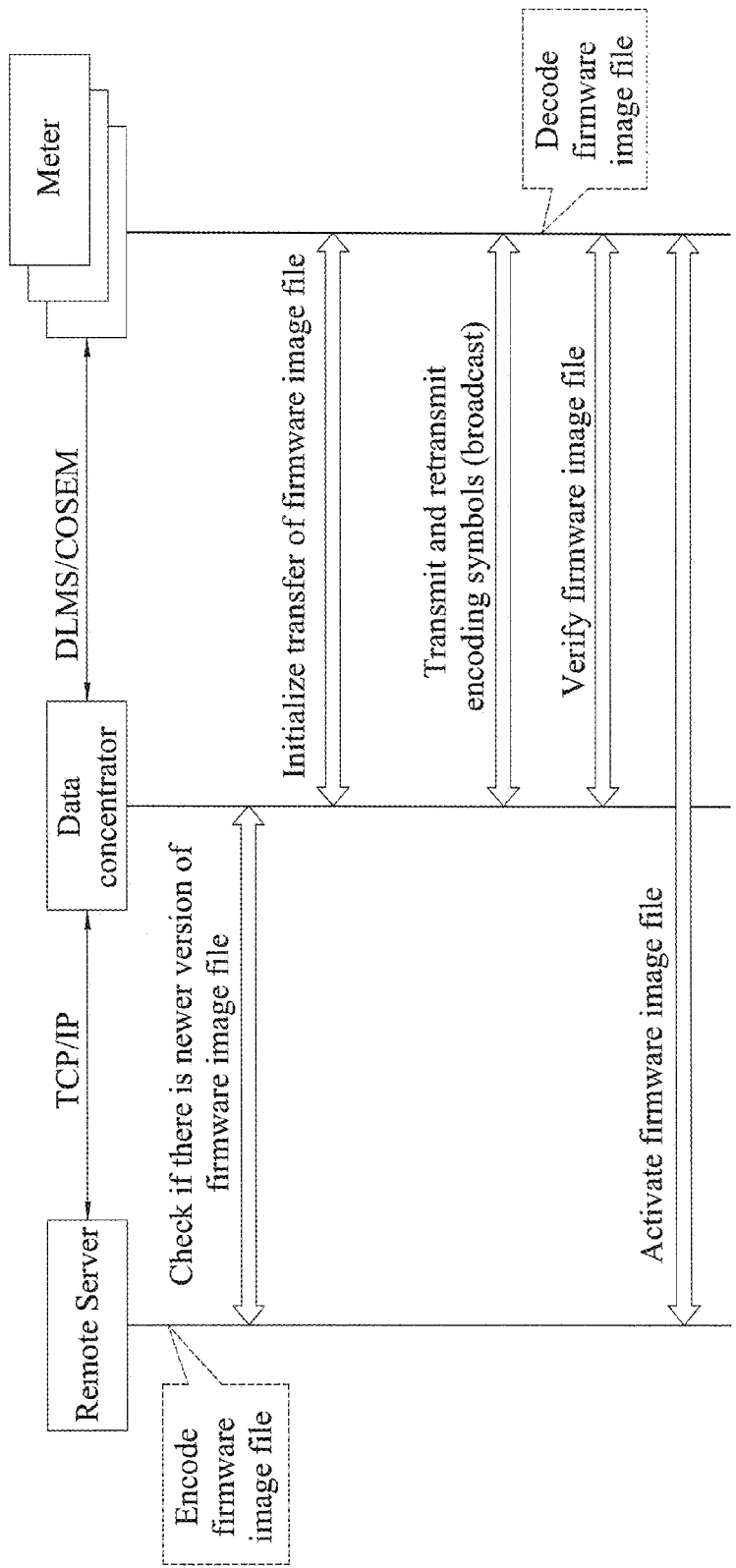
FIG. 7 is a flowchart illustrating another embodiment of the method for firmware upgrade in an AMI in accordance with the present disclosure.

FIG. 7 is a flowchart illustrating another embodiment of the method for firmware upgrade in an AMI in accordance with the present disclosure. As shown, a remote server and a data concentrator communicate with each other through TCP/IP communication protocol. The data concentrator and meters are connected through Device Language Message Specification (DLMS) and Companion Specification for Energy Metering (COSEM).

First, the remote server encodes the firmware image file with a specific firmware block size to generate encoding symbols of the firmware image file. More specifically, the data concentrator requests the remote server to see if there is a newer version of the firmware image file. If there is a newer version of the firmware image file, the data concentrator will obtain the encoding symbols from the remote server. Thereafter, the initialization of firmware image file transfer is executed between the data concentrator and the meters.

Next, the transmission and retransmission of the encoded firmware image file (i.e., encoding symbols) are executed between the data concentrator and the meters. The encoding symbols in this embodiment are generated through FEC encoding mechanism, so the meters collect a certain number of encoding symbols for the decoding of the encoding symbols to take place.

Then, verification of the firmware image file is executed between the data concentrator and the meters to ensure the files received by the meters are correct, including checking the version and the status of integrity of the firmware image file.

Finally, the meters obtain activation codes from the remote server (through the data concentrator in the middle). When the activation code is determined to be correct, the activation code is used to activate the firmware image file in the meter in order for firmware upgrade to be carried out.

In this embodiment, the encoding of the firmware image file is carried out at the remote server, which is different from the FIG. 4 in terms of the time at which the encoding is performed and the processing devices. From the above, it is clear that the firmware image file is encoded before transmission (broadcasting), so the encoding can be performed in either the remote server or the data concentrator.

Figure 8A:
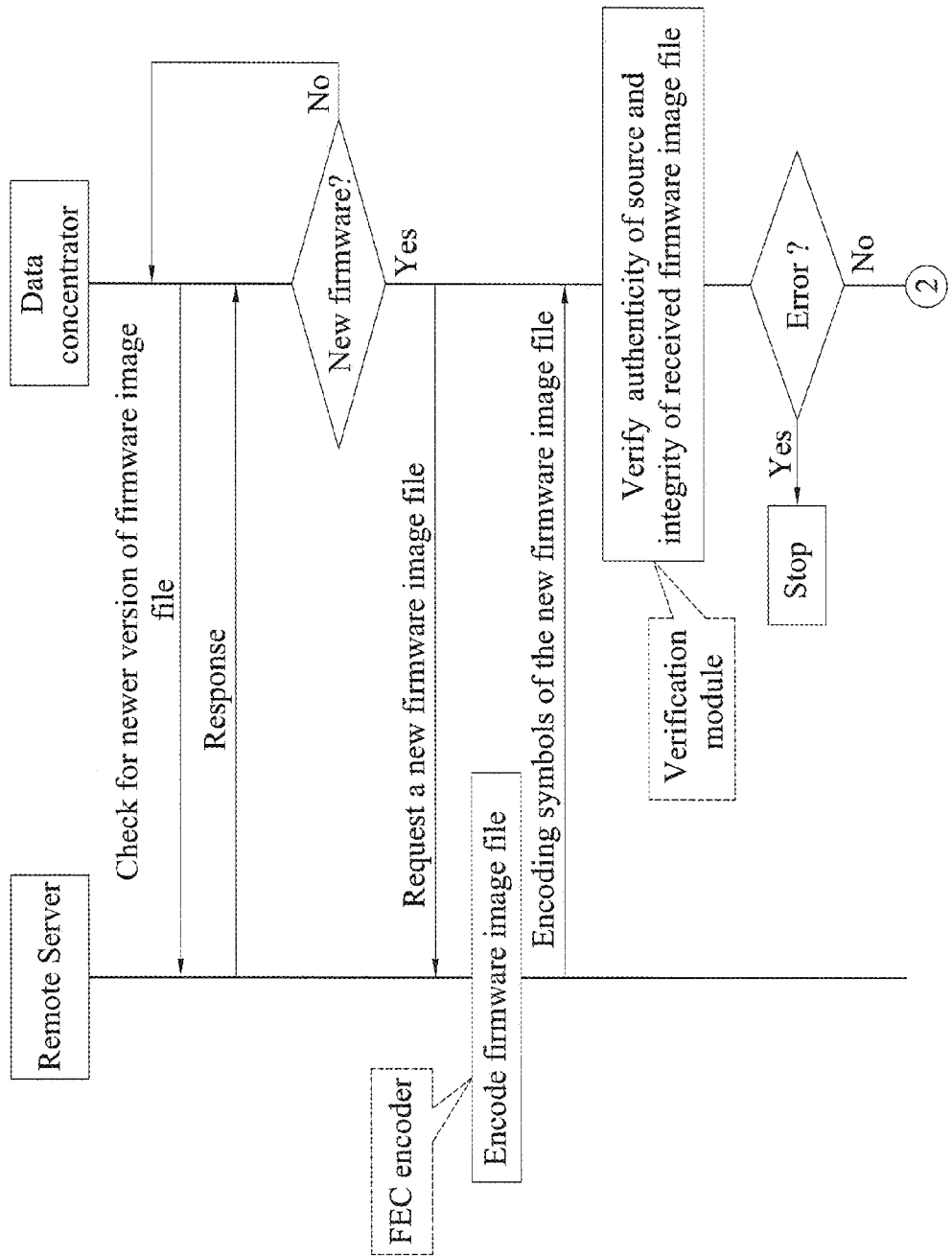
FIGS. 8A and 8B are flowcharts illustrating the steps of the embodiment in FIG. 7.
Figure 8B:
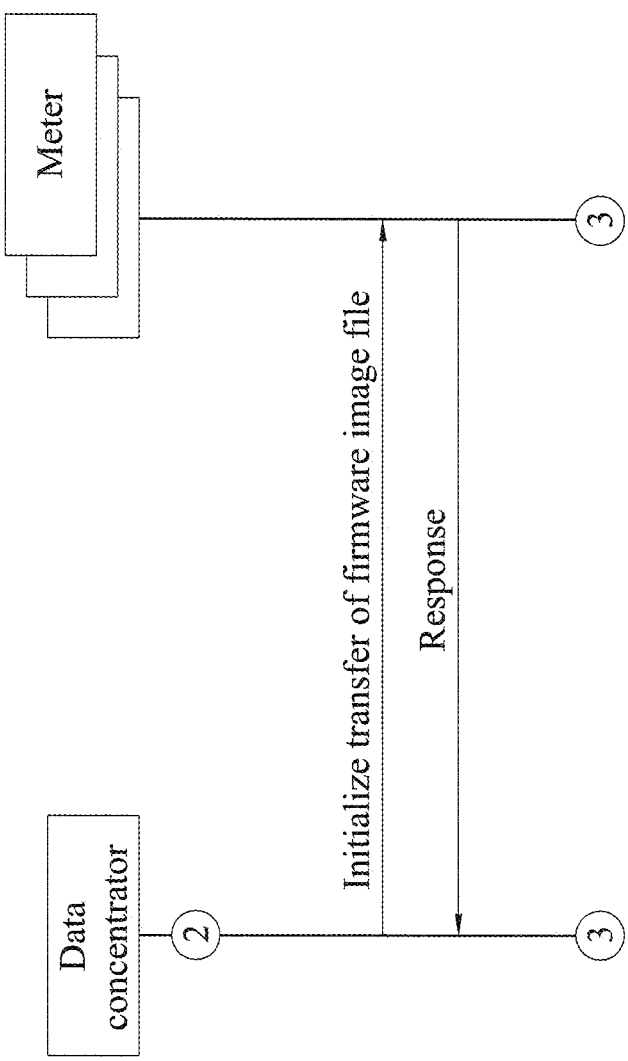

FIGS. 8A and 8B are flowcharts illustrating the steps of the embodiment just mentioned, wherein the encoding of the firmware image file is done at the remote server with reference to the embodiments shown in FIGS. 6 and 7. The transmission and verification processes between the data concentrator and the meters after encoding are similar and will not be repeated again.

As shown in FIG. 8A, the data concentrator inquires the remote server to check if there is a newer version of the firmware image file. If the reply from the remote server is negative, a period of time is elapsed before the next inquiry. If the reply is positive, the new firmware image file is requested. The remote server transmits the new firmware image file to the data concentrator accordingly wherein the new firmware image file has already been FEC encoded in the remote server. Then, the data concentrator performs source verification to ensure the remote server is legitimate, and makes sure the integrity of the received firmware image file. If there is an error, the process is stopped; else, proceed to the next step. Similarly, the legitimacy of the remote server can be verified by asymmetric encryption algorithms.

As shown in FIG. 8B, initialization of firmware image file transfer is executed between the data concentrator and the meters, in which the data concentrator notifies the meters of the firmware block size and the size of transmission frames in order to initialize the transfer of the firmware image file.

Compared to the step shown in FIG. 5B, in this embodiment, the data concentrator obtains a firmware image file already encoded by the remote server, so the data concentrator needs not to encode the firmware image file again. This embodiment is applicable to the scenario where the firmware block sizes supported by the meters are all the same. In other words, if the firmware block size of the meters is known in advance, the data concentrator does not need to inquire the meter the supported block size, and the remote server can directly encode the firmware image file with the specific firmware block size. After FIGS. 8A and 8B, the steps shown in FIGS. 5C to 5E can be carried out, and thus will not be repeated herein.

Figure 9A:
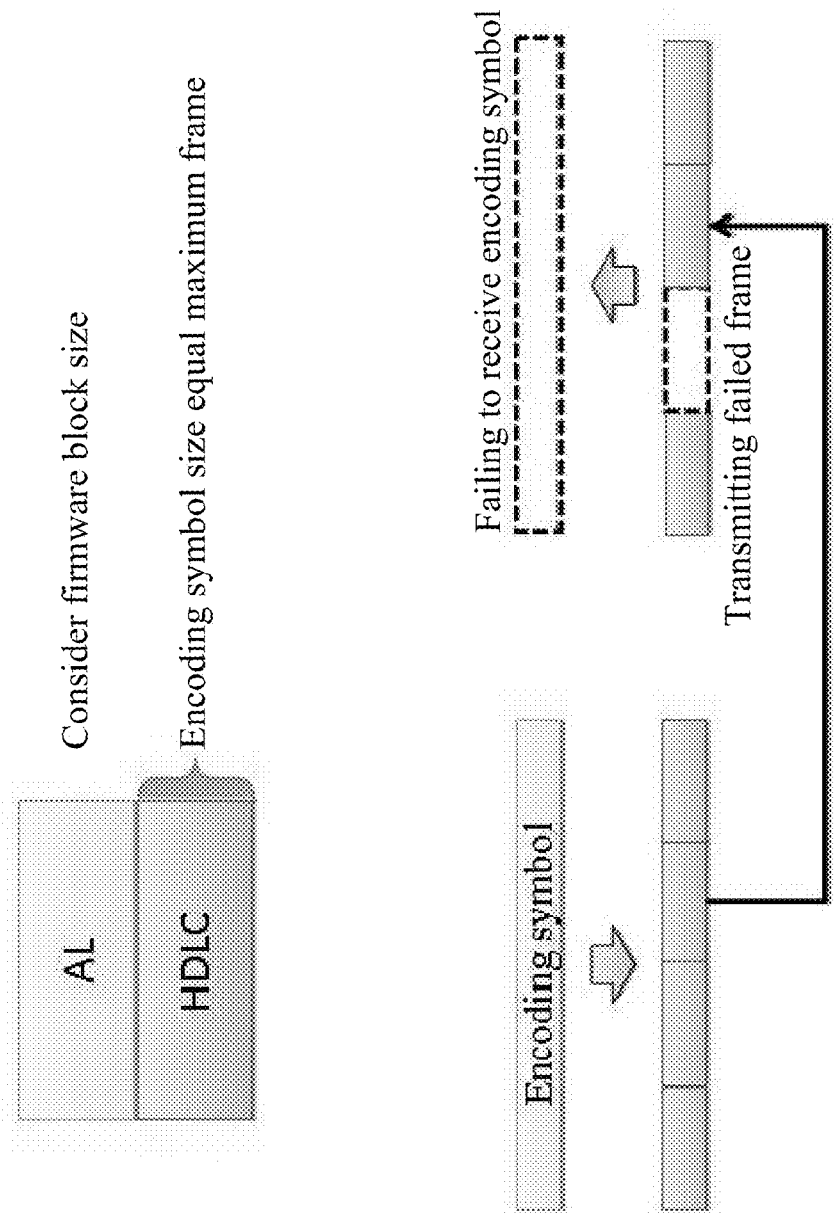
FIGS. 9A and 9B are diagrams illustrating the encoding symbol length algorithm and the retransmission calculating algorithm in accordance with the present disclosure, respectively.
Figure 9B:
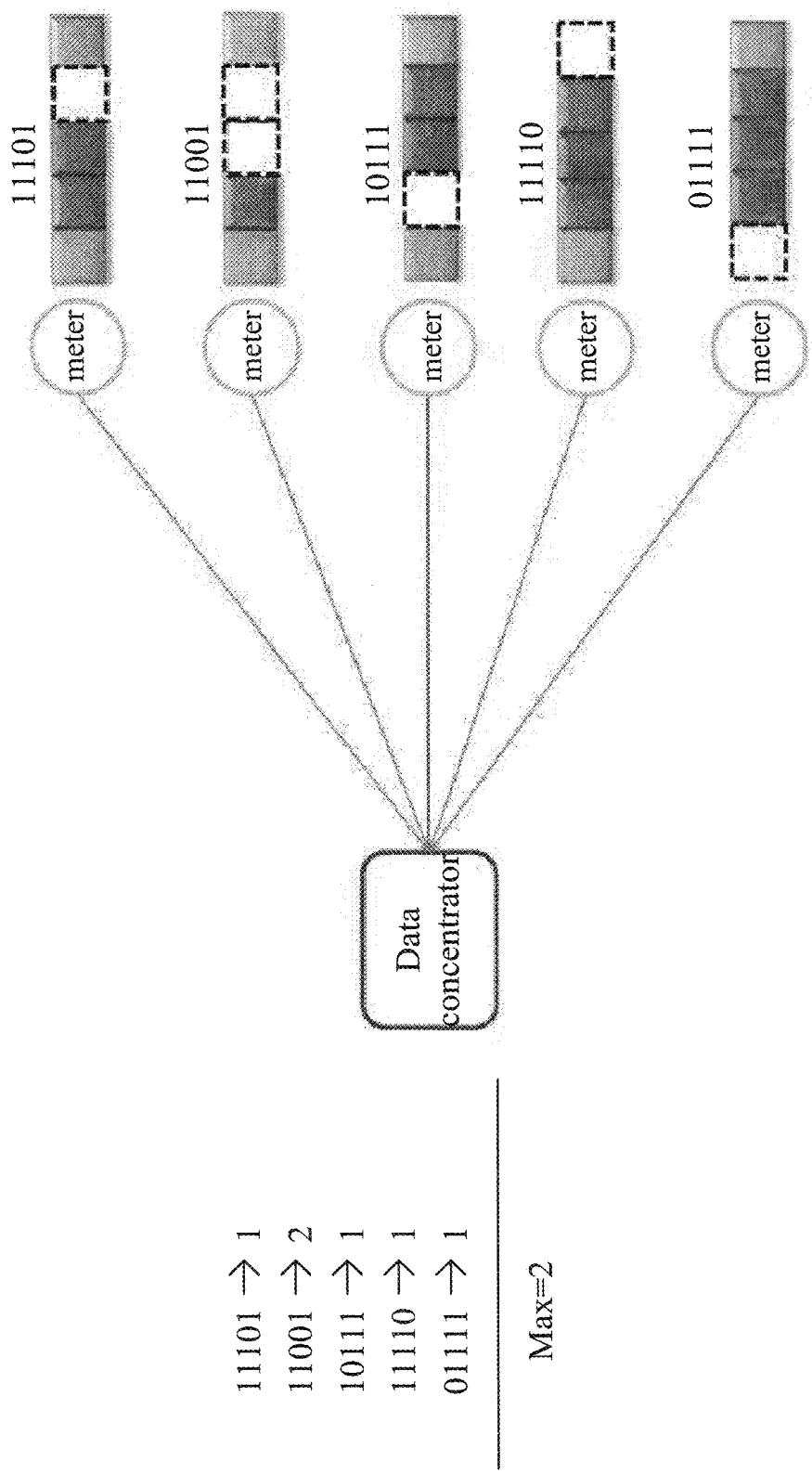

FIGS. 9A and 9B are diagrams illustrating the encoding symbol length algorithm and the retransmission calculating algorithm in accordance with the present disclosure, respectively. As shown in FIG. 9A, the basic theory of the encoding symbol length algorithm is described. The encoding symbol length algorithm essentially gathers the transmission constraint of the meter, and calculates the most appropriate encoding symbol length. More specifically, the packet size to be transmitted is usually based on the transmission size of the Application Layer (AL), but if the High-Level Data Link Control (HDLC) layer cannot transmit at the size of the AL, the packet will be partitioned into frames of smaller lengths for transmission. As shown, if a single encoding symbol is partitioned into four parts for transmission, and one of them failed to be received, the encoding symbols cannot be recovered. Thus, in order to prevent this, the encoding symbol will be partitioned by the smaller one of the firmware block size and the transmission frame size.

The encoding symbol length algorithm of this embodiment is given as follows:

```
Procedure Calculate_E
for i = 1 to n do
   if i = 1 then
      E = (BS_i < HFS_i) ? (BS_i – ALH) : (HFS_i – HH));
   else
      min_E = (BS_i < HFS_i) ? (BS_i – ALH) : (HFS_i – HH));
      E = min(E, min_E);
   end
return E;
```

In the above algorithm, $BS\_i$ is the firmware block size (bytes) of the $i^{th}$ meter; $HFS\_i$ is the frame size (bytes) supported by HDLC layer in the $i^{th}$ meter; ALH is the header size (bytes) of the Application Layer; HH is the header size (bytes) of the HDLC layer; and E is the encoding symbol length (bytes). Since there are n meters, this procedure is iterated n times. If $BS\_i$ is smaller than $HFS\_i$, E=$BS\_i$–ALH. If $BS\_i$ is larger than $HFS\_i$, E=$HFS\_i$–HH. Finally, the same method is used for calculating min_E. Then, E and min_E are compared, and the smaller of the two becomes E in the next iteration. After n iterations, E is the minimum.

As shown in FIG. 9B, the theory of the retransmission calculating algorithm is described. The retransmission calculating algorithm essentially calculates how many encoding symbols are required for retransmission. The fewer the number of encoding symbols requiring retransmission is, the higher the transmission efficiency becomes. As shown, the data concentrator is connected with five meters. After transmitting for a period of time, the meter will lack different encoding symbols. This is indicated by bit strings of 1s and 0s. The meters will report the encoding symbols receiving status back to the data concentrator. As shown in the left-hand side of the diagram, the number of 0s in each bit string is calculated (0 indicates an encoding symbol was not received), and the maximum of the numbers of 0s among these bit strings are determined. In this embodiment, the maximum number is two. This will be the number of encoding symbols requiring transmission next. It can be seen that, during the process of firmware upgrade, the data concentrator does not need to know which encoding symbols are received or missing in the meter; preferring instead to know how many more encoding symbols are required for decoding to take place to recover the original firmware image file in the meter.

The retransmission calculating algorithm of this embodiment is given as follows:

```
Procedure Calculate_R
   R = 0;
   s = ceil(L/E);
   for each i = 1 to n do
      R = max( R, s – popcount(TS_i));
   end
   return R
```

In the algorithm above, $TS\_i$ is the bit string indicating the receiving status of the encoding symbols in an $i^{th}$ meter; L is the firmware image file length (bytes); E is the encoding symbol length (bytes); R is the number of encoding symbols to be retransmitted, wherein the firmware image file is partitioned into S firmware blocks. The total number S minus the number of 1s in the bit string yields the number of blocks not received. Similarly, the procedure is executed n times to obtain the maximum R value, which is the number of encoding symbols to be retransmitted. Popcount ( ) function is used to calculate the number of 1s in a bit string.

In summary, the present disclosure discloses a system and method for firmware upgrade in an AMI to improve the performance and security of firmware upgrade in the AMI. The present disclosure employs broadcast and multicast transmission forms to avoid low transmission performance as a result of one-to-one transmission in the prior art. The present disclosure also employs an encoding symbol length algorithm to solve the existing shortcoming that the files lacked by the meter could be retransmitted separately. In addition, the present disclosure provides source verification and end-to-end security verification to ensure the legitimacy of the firmware obtained, thereby achieving efficient and safe remote firmware upgrade without affecting the metering due to low upgrade efficiency, and improving the correctness and safety of firmware upgrade.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A system for firmware upgrade in an Advanced Metering Infrastructure (AMI), comprising:
   a remote server comprising hardware including a database to store a firmware image file, and configured to generate a digital signature and an activation code;
   a data concentrator connected to the remote server, and configured to:
      verify the firmware image file from the remote server using the digital signature; and
      broadcast a predetermined number or more of encoding symbols generated from the firmware image file, to obtain minimum retransmission contents based on a receiving status of the encoding symbols, and further to broadcast new encoding symbols, wherein the amount of which matches the minimum retransmission contents, and the amount of the new encoding symbols and the encoding symbols broadcasted previously is equal to the predetermined number, wherein the new encoding symbols have not been previously sent; and at least a meter connected to the data concentrator to receive the encoding symbols, the meter including:
a forward error correction (FEC) decoder to decode the encoding symbols from the data concentrator and recover the firmware image file based on the encoding symbols;
wherein the meter is further configured to check the status of completion of the firmware image file recovered by the FEC decoder, and to obtain the activation code generated by the remote server from the data concentrator, the activation code after successful verification being used to drive firmware upgrade of the meter.

2. The system of claim 1, wherein the data concentrator compares the predetermined number with a number of encoding symbols received by the meter to obtain a number of encoding symbols by the meter to recover the firmware image file as the minimum retransmission contents.

3. The system of claim 1, wherein the data concentrator further includes an FEC encoder to gather the sizes of firmware blocks and sizes of transmission frames of the meter to obtain a transmission constraint of the meter, to compare the transmission constraint of the meter to obtain a unit partition size of the encoding symbols, and to encode the firmware image file received to create at least one encoding symbol having a size that matches the unit partition size.

4. The system of claim 1, wherein the remote server further includes an FEC encoder to encode the firmware image file with a specific firmware block size to generate encoding symbols of the firmware image file to be transmitted to the data concentrator.

5. A method for firmware upgrade in an Advanced Metering Infrastructure (AMI), comprising:
obtaining, by using a data concentrator, a firmware image file from a remote server comprising hardware, and confirming legitimacy of the firmware image file through a source verification mechanism;
broadcasting, by using the data concentrator, at least one encoding symbol generated by encoding the firmware image file to at least one meter, wherein the number of the at least one encoding symbol is a predetermined number, calculating minimum retransmission contents based on a message returned by the at least one meter, and further transmitting encoding symbols that are not broadcast in the encoding symbols, the amount of which matching the minimum retransmission contents, until the at least one meter has received enough encoding symbols to recover the firmware image file, wherein the amount of the enough encoding symbols is equal to the predetermined number, wherein the new encoding symbols have not been previously sent; and
verifying version and integrity of the firmware image file; and
obtaining, by using the at least one meter, an activation code and activating firmware upgrade once correctness of the activation code is confirmed.

6. The method of claim 5, wherein the source verification mechanism includes verifying the legitimacy of the firmware image file through asymmetric encryption algorithms.

7. The method of claim 5, wherein the encoding of the firmware image file includes the data concentrator obtaining a transmission constraint supported by the at least one meter and encoding the firmware image file based on the transmission constraints of the at least one meters through an encoding symbol length algorithm to generate at least one encoding symbols, and the remote server encodes the firmware image file with a predetermined firmware block size to generate an encoded firmware image file and transmitting the encoded firmware image file to the data concentrator for subsequent transmission.

8. The method of claim 7, wherein the transmission constraint of the at least one meter includes the firmware block size and a transmission frame size of the at least one meter, and the data concentrator determines a unit partition size of the encoding symbols based on the transmission constraints of the at least one meter.

9. The method of claim 7, wherein the encoding symbol length algorithm gathers the firmware block size and a transmission frame size supported by the at least one meter and obtains the transmission constraint of the at least one meter from the firmware block size and the transmission frame size, and compares the transmission constraints of the meters to obtain the minimum one as the unit partition size of the encoding symbols.

10. The method of claim 5, wherein the message returned by the at least one meter indicates a receiving status of the encoding symbols of the respective meter.

11. The method of claim 5, wherein calculating the minimum retransmission contents includes using a retransmission calculating algorithm to compare the number of encoding symbols received by the at least one meter with a firmware block number of the at least one meter to calculate the number of encoding symbols by the at least one meter to recover the firmware image file, and the maximum one is used as the minimum retransmission contents.

12. The method of claim 5, wherein the at least one meter obtaining an activation code and activating firmware upgrade includes allowing the data concentrator to obtain the activation codes for the at least one meter from the remote server and transmit the activation codes to the respective meters.

* * * * *